Patented July 29, 1930

1,771,508

UNITED STATES PATENT OFFICE

EMIL E. NOVOTNY, OF PHILADELPHIA, PENNSYLVANIA, ASSIGNOR TO JOHN STOGDELL STOKES, OF SPRING VALLEY FARMS, PENNSYLVANIA

METHOD OF MAKING SYNTHETIC RESINS

No Drawing. Application filed August 14, 1926. Serial No. 129,284.

This invention relates to the method of producing synthetic resin plastics wherein a phenolic body is simultaneously caused to combine with furfural and formalin, resulting in a resinous product or sludgelike plastic having a lighter color than where the furfural is alone caused to combine with the said phenolic body. The object of this invention is to produce a synthetic resin or varnish which will be light in color and, therefore, more desirable in the manufacture of laminated sheets of paper or textile products. The product is of a golden brown shade and is neater in appearance than products made of the very light colored resin of formaldehyde alone or of the darker furfural resin.

In this reaction where the phenolic body is a higher homologue of phenol such as, for example, xylenol, it is not at all necessary to use a catalytic agent in order to produce this resin. The product is of the potentially reactive type and does not need to have added to it a hardening agent such as an active methylene body or some other aldehyde or aldehyde derivative such as furfural or furfuramid. However, for certain classes of work I have found it a help to add such a hardening agent in minute quantities such as, for example, hexamethylenetetramin in small amounts as, for instance, one tenth of one per cent of the weight of phenol and furfural used.

Besides giving a light color the product when dried on paper sheets, etc., forms a very desirable gel or tough varnish coating which does not dust readily when impregnated into these paper sheets. This is very desirable as a dusty sheet of impregnated material will not make a desirable facing of even uniform color throughout and furthermore it is very undesirable from a physiological standpoint to have this resin dust floating in the air when the sheets are being cut from the roll and during the subsequent handling of the product preliminary to the final pressing operation.

The material has good penetrating qualities and shows up very well from a standpoint of high dielectric and mechanical value and is, therefore, useful for various laminated structures and plastics or powdery molding compositions already well known in the art.

The reaction of a phenolic body simultaneously in the presence of an active methylene body such as, for example, formaldehyde and an active furane body such as furfural can be carried on with great uniformity and precision. The viscosity at the beginning is low and it is a very simple matter to remove water of solution and synthetic water formed during the reaction, and no special apparatus such as that required for vacuum distillation or for reactions at pressures higher than atmospheric need be used. This greatly simplifies the production of these resinous products. The product may be produced in various viscosities from a liquidlike material through the stages of a sludgelike product until finally the final, hard or grindable variety of resins is produced. These grindable resins may have various melting points as the conditions under which they are to be used require.

As the aldehydes are thoroughly combined with the phenolic body the product can be readily comminuted or may be precipitated out of solution at the beaters or otherwise applied during the process of manufacture of the textile or sheeted products. These sheeted products may be pressed into form, forming sheetlike bodies of various shapes or may be preliminarily comminuted producing molding powders for use in dies, etc.

In order that this invention may be better understood, the following examples are given by way of illustration. The proportions, however, need not be followed out exactly as wide variations in the proportions may be used, and there is no serious objection if an excess of the aldehydes is used to the molecular ratio of the phenolic body used, and it is to be understood that the proportion of the furfural and formalin may be varied within wide limits without seriously departing from the spirit of this invention. It should likewise be understood that wherein these formulas call for the use of ordinary formaldehyde in watery solution it is permissible to utilize various dehydration and polymerization products of formaldehyde or, for that matter, any body containing active methylene groups in suitable condition to form the resin as described herein. The furfural likewise should be construed as covering any reactive furane body suitable as an equivalent therefor.

Example 1

Place in a suitable enclosed still or digester provided with a condenser or condensers for refluxing and distillation and provided with suitable stirring device, material inlets and outlets, etc., and preferably heated by means of a steam jacket, said steam jacket likewise being provided with a cold water inlet and outlet for cooling. Put in this receptacle the following raw materials:

| | |
|---|---|
| Xylenol, commercial grade preferably | 2600 |
| Furfural | 1300 |
| Formalin (ordinary 37 to 40% formaldehyde solution) | 1240 |

The above quantities are given as parts by weight.

Boil under the reflux condenser for from one to two hours or until a proper preliminary viscosity has been obtained, then distil off until a total of about 987 parts by weight consisting primarily of water of solution and synthetic water of reaction have been removed. After the distillation has been completed place condenser in reflux position, or use condenser provided for this purpose, and boil for from three to six hours or until the proper final viscosity has been obtained. The product is now in condition for use, and is a low melting point sludge or varnish or lacquer base and may readily be cut with a suitable solvent such as alcohol, acetone, furfural or a mixture of solvents. In this example I shall add 1400 parts by weight of ordinary denatured alcohol. The material is now discharged into suitable drums and is ready for use.

Example 2

| | |
|---|---|
| Cresol, commercial grade | 2600 |
| Furfural | 1300 |
| Formaldehyde | 1240 |
| Potassium carbonate | 13 |

Place materials into a suitable digester provided with a condenser for refluxing and distillation, also provided with suitable stirring apparatus and preferably jacketed for heating and cooling. Boil under reflux condenser for from one to two hours and then distil off approximately 19% of the total kettle output or approximately 1017 parts as given above. The distillation is continued until a maximum temperature of 244° F. has been reached. Arrange condenser for refluxing and bring to a boil and maintain boiling with a temperature of the contents of the digester at from 230° to 240° F. This boiling is maintained for a period of from 1½ to 2½ hours. At this point, if a varnish is desired, about 145 parts of alcohol may be introduced into the hot contents of the kettle and the product may thereupon be emptied into suitable drums. Upon analysis the varnish will contain about 75% resin solids. If a harder variety of resin is desired the boiling may be continued for a longer length of time until a resin having the desired melting point has been obtained.

It is to be understood that these resins may be mixed with any suitable organic solvent such as alcohol, acetone, furfural, furfur-alcohol, or various mixtures of solvents in order to make suitable varnishes for impregnation or coating purposes. Various colors such as dyes or pigments may be added at the beginning, during or at the end of the reaction. Where pigments are used these are preferably added in solution after the reaction in colloidal suspension. Various fillers may be introduced such as those of an organic or inorganic nature, as is already well known. Likewise, various lubricants and plasticizing agents may be added at any suitable time. For lubricants and plasticizers I prefer to use materials of a liquid, semi-solid or solid nature consisting of various oils, waxes, etc., such as, for example, china wood oil, lamolin, stearic acid, calcium stearate, etc. These may be added through the agency of a secondary solvent, if necessary, to hold such lubricants or plasticizers in solution. For certain purposes, of course, lubricants or plasticizers may be added before or after the resinous products have been incorporated with the filling or extending materials.

What I claim is:

1. The herein described method of making a synthetic resin from a phenolic body and formaldehyde and furfural, consisting in the step of reacting in one operation both the formaldehyde and the furfural with the phenol at a temperature sufficiently high to cause the mixture to boil.

2. The herein described method of making a synthetic resin from a phenolic body and formaldehyde and furfural consisting in the step of reacting in one operation both the formaldehyde and the furfural with the phenol at a temperature substantially at which the mixture will boil whereby a light brown potentially reactive resinous product is produced.

3. The herein described method of making a synthetic resin from a phenolic body and formaldehyde and furfural consisting in the step of reacting at a temperature sufficiently high to cause the mixture to boil in one operation without the aid of a catalyst both the formaldehyde and the furfural with the phenol.

4. The herein described method of making a synthetic resin comprising boiling together a phenol with formaldehyde and furfural, distilling off most of the water of solution and synthetic water and heating the resin thus formed until the resin has the predetermined viscosity desired.

5. A potentially reactive composition comprising a resinous product obtained by reacting of a phenol with furfural and formaldehyde at a temperature at which the mixture will boil whereby a potentially reactive resin is obtained in a one step operation.

6. A potentially reactive resinous material free from catalytic agents at the time of its formation, comprising a resinous product resulting from an uncatalyzed reaction of phenol with furfural and formaldehyde in a one step operation.

7. The herein described method of making a synthetic resin from homologs of phenol and formaldehyde and furfural consisting of heating formaldehyde, furfural and a homolog of phenol simultaneously to a temperature at which the mixture will boil whereby a resin is formed in a one step operation.

Signed at Philadelphia in the county of Philadelphia and State of Pennsylvania this 13th day of August, A. D. 1926.

EMIL E. NOVOTNY.